Sept. 17, 1935.         D. C. PRINCE                2,015,041
            PROTECTIVE MEANS FOR MERCURY ARC DEVICES
                    Original Filed Aug. 12, 1930
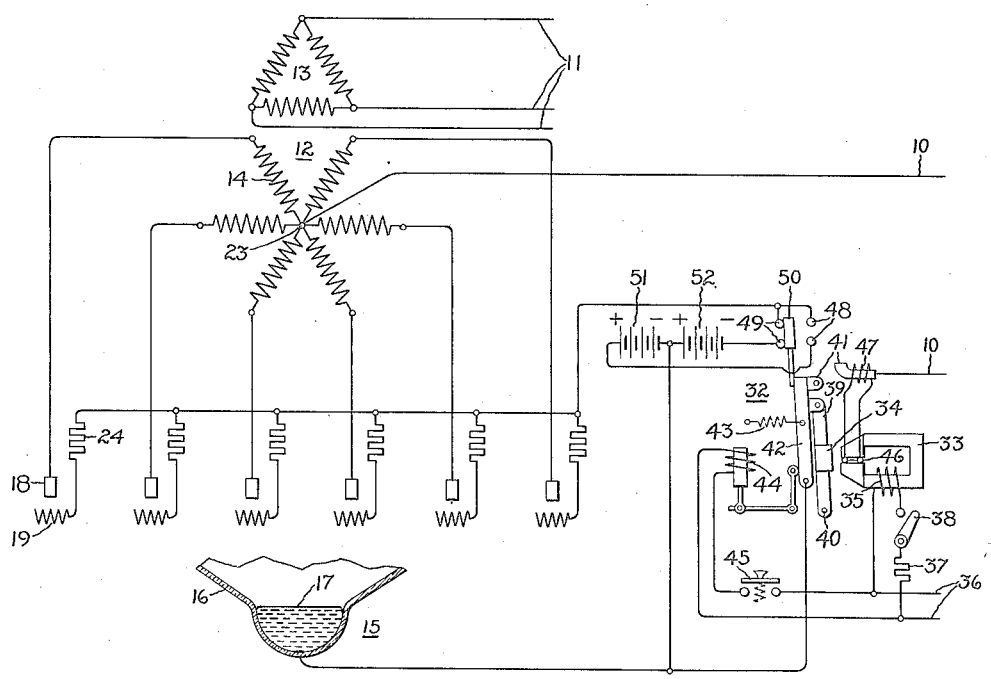
Inventor:
David C. Prince,
by  Harry E. Dunham
     His Attorney.

Patented Sept. 17, 1935

2,015,041

UNITED STATES PATENT OFFICE 2,015,041

PROTECTIVE MEANS FOR MERCURY ARC DEVICES

David C. Prince, Swarthmore, Pa., assignor to General Electric Company, a corporation of New York Original application August 12, 1930, Serial No. 474,841. Divided and this application April 30, 1935, Serial No. 18,998

10 Claims. (Cl. 175—363)

This application is a division of my copending application, Serial No. 474,841, filed August 12, 1930, assigned to the same assignee as the present application.

My invention relates to electric systems wherein power is transmitted between direct and alternating current circuits by means of vapor electric devices such as mercury arc rectifiers and has for its principal object the provision of improved apparatus whereby the systems are protected against electrical disturbance and damage caused by arc back in the vapor electric devices.

Difficulties have been encountered heretofore in the operation of vapor electric devices of the mercury arc rectifier type due to the occurrence of arc-back between negatively and positively charged anodes, or between other parts of these devices. The causes of arc-back have been obscure and no entirely satisfactory means have been provided heretofore for limiting to a negligible amount, or for preventing entirely, the damage thereby occasioned to transformer windings and other rectifier apparatus. In accordance with my invention this difficulty is avoided by the provision of means responsive to the reverse current accompanying arc back for impressing a potential of such value on control electrodes associated with the anodes of the rectifier that, on occurrence of arc back, the flow of current therein is prevented.

My invention will be better understood from the following description when considered in connection with the accompanying drawing and its scope will be pointed out in the appended claims.

Referring to the drawing, the single figure thereof is a diagram illustrating a rectifier system embodying the invention.

In the system shown in the figure, power is transmitted between a direct current circuit 10 and an alternating current circuit 11 through a main transformer 12 having primary windings 13 and secondary windings 14, and a vapor electric device 15. This device in the present embodiment of the invention is a rectifier comprising an evacuated vessel 16, only the lower part of which is shown in the figure, a mercury cathode 17, anodes 18 and control electrodes 19 associated therewith.

Reverse current flowing upon occurrence of arc-back is utilized to operate a switch 32 which comprises high speed circuit breaker means arranged to open the direct current circuit 10 and simultaneously to operate relay means for impressing a suitable negative potential on the control electrodes 19. The control and operating aparatus of the circuit breaker portion of switch 32 includes a holding magnet 33 which is provided with an armature 34 and with a holding coil 35 arranged to be energized through a suitable circuit 36, a resistor 37, and a switch 38. The armature 34 is mounted on a member 39 which is pivoted at 40 and is coupled to one of the main contact members 41 of the switch through a member 42. This member is biased to the position shown in the figure by a spring 43 and is arranged to move the armature 34 into engagement with holding magnet 33 in response to energization of a closing coil 44 shown as connected to the circuit 36 through a switch 45. The holding magnet 33 is provided with another coil 46, connected in series with a coil 47 arranged to be energized by reverse current flowing in the direct current circuit 10. The various features of the circuit breaker portion of switch 32 are more fully disclosed in a Reissue Letters Patent to J. F. Tritle, No. 15,441, August 29, 1922.

The relay means operated by the above described circuit breaker portion of switch 32 comprises relay contacts 48, 49 and a relay contact member 50 connected to member 42. Contacts 48 and 49 are respectively adapted to connect current sources 51, 52 between the cathode 17 and the control electrodes 19. These current sources are so arranged that when the switch 32 operates to close contact 48 a potential positive with respect to the cathode is impressed through grid resistors 24 on the control electrodes 19, and when this switch operates to close contacts 49 the potential impressed on the control electrodes is negative with respect to the cathode. The switch 32 is so arranged that when the main contact members 41 are closed, to connect the rectifier to the direct current circuit 10, the relay contacts 48 are also closed, to connect current source 51 between the cathode 17 and control electrode 19, and that when the contacts 41 are open, to disconnect the rectifier, the relay contacts 49 are closed to connect current source 52 between the cathode and the control electrodes.

In the operation of the system, main switch contacts 41 are normally maintained in closed position by the flux produced in magnet 33 by holding coil 35. At the same time, the relay contacts 48 remain closed and a positive potential of any desired value, as required in normal operation, is thereby impressed on the control electrodes 19 by current source 51. Upon occurrence of arc-back affecting one or more of the anodes the accompanying reversal of current in circuit 10 induces a current in coil 47. This induced current in coil 47 flows also in coil 46 connected in series therewith, the magnetic flux of the holding magnet 33 is shifted from the armature 34 to the iron core of the series coil 46 in a well known manner, and the switch contacts 41 are opened by the spring 43, thereby preventing power from the direct current network from concentrating on the anode which is arcing back. It is known that the speed of a circuit breaker of the type above described is such that the circuit 10 may be opened in less than one cycle of the alternating supply voltage of the rectifier. Simultaneously with the opening of the direct current circuit 10 at contacts 41 by switch 32, the contacts 49 are closed and a negative potential is impressed on the control electrodes 19 by current source 52. This negative potential causes the anodes to cease carrying current in succession, so that within one cycle, the flow of energy from the alternating current circuit 11 into the short circuit which constitutes the arc-back is also interrupted and the rectifier is ready to resume operation as soon as the auxiliary arc usually provided is started and the switch 32 reset in closed position.

What I claim as new and desire to secure by Letters Patent of the United States, is:

1. The combination of a direct and an alternating current circuit, means for transferring power between said circuits including an arc discharge device having a cathode, a plurality of anodes and control electrodes therefor, and common means to stop simultaneously the flow of energy to said discharge device from both of said circuits, said common means comprising switch means responsive to reverse current in said device to disconnect said device from said direct current circuit and relay means actuated by said switch means to impress on said control electrodes a potential negative with respect to said cathode.

2. The combination of a direct and an alternating current circuit, means for transferring power between said circuits including an arc discharge device having a cathode, a plurality of anodes and control electrodes therefor, and common means to prevent flow of energy to said device from both circuits simultaneously on occurrence of arc back affecting one or more of said anodes, said means comprising a switch operable in response to reverse current in said direct current circuit to disconnect said device therefrom to prevent flow of reverse current in said anode affected by arc back, and comprising means including relay means actuated by said switch to impress on said control electrodes a potential negative with respect to said cathode to prevent flow of current in said device due to the potential impressed on said plurality of anodes from said alternating current circuit.

3. The combination of a direct and an alternating current circuit, means for transferring power between said circuits including an arc discharge device having a cathode and a plurality of anodes and control electrodes therefor, a switch means responsive to reverse current in said device to disconnect said device from said direct current circuit upon occurrence of arc back in said device, and relay means actuated by said switch means to impress upon said control electrodes when said switch is closed a potential positive with respect to said cathode and to impress upon said control electrodes when said switch is open a potential negative with respect to said cathode.

4. The combination of a direct and an alternating current circuit, means for transferring power between said circuits including an arc discharge device having a cathode and a plurality of anodes and control electrodes therefor, a switch operable in response to reverse current in said direct current circuit to disconnect said device therefrom to prevent flow of reverse current in said device due to arc back, and relay means actuated by said switch, said relay means operating when said switch is closed to impress upon said control electrodes a potential positive with respect to said cathode, said relay means operating when said switch is open to impress upon said control electrodes a potential negative with respect to said cathode.

5. The combination of a direct and an alternating current circuit, means for transferring power between said circuits including an arc discharge device having a cathode, a plurality of anodes and control electrodes therefor, and a unitary switch means to stop simultaneously the flow of energy to said discharge device from both of said circuits, said switch means comprising a circuit breaker responsive to reverse current in said device to open said direct current circuit and a relay means mechanically actuated by said circuit breaker to impress upon said control electrodes a potential negative with respect to said cathode.

6. The combination of a direct and an alternating current circuit, means for transferring power between said circuits including an arc discharge device having a cathode, a plurality of anodes and control electrodes therefor, and a unitary switch means to stop the flow of energy to said device from both circuits simultaneously upon occurrence of arc back affecting one or more of said anodes, said unitary switch means comprising a circuit breaker operable in response to reverse current in said direct current circuit to disconnect said discharge device therefrom to prevent flow of reverse current in said anode affected by arc back, and comprising relay means mechanically actuated by said circuit breaker to impress upon said control electrodes a potential negative with respect to said cathode to prevent flow of current in said discharge device due to the potential impressed upon said plurality of anodes from said alternating current circuit.

7. The combination of a direct and an alternating current circuit, means for transferring power between said circuits including an arc discharge device having a cathode and a plurality of anodes and control electrodes therefor, and a unitary switch means to stop flow of energy to said device from both circuits simultaneously, said switch means comprising a circuit breaker responsive to reverse current in said device to disconnect said device from said direct current circuit upon occurrence of arc back in said device, and comprising relay means actuated by said switch means to impress upon said control electrodes when said switch is closed a potential positive with respect to said cathode and to impress upon said control electrodes when said switch is open a potential negative with respect to said cathode.

8. The combination of a direct and an alternating current circuit, means for transferring power between said circuits including an arc discharge device having a cathode and a plurality of anodes and control electrodes therefor, and a unitary switch means to stop flow of energy to said device from both circuits simultaneously, said switch means comprising a circuit breaker operable in response to reverse current in said direct current circuit to disconnect said device therefrom to prevent flow of reverse current in said device due to arc back, and comprising relay means actuated by said circuit breaker, said relay means operating when said circuit breaker is closed to impress upon said control electrodes a potential positive with respect to said cathode, said relay means operating when said circuit breaker is open to impress upon said control electrodes a potential negative with respect to said cathode.

9. The combination of a direct and an alternating current circuit, means for transferring power between said circuits including an arc discharge device having a cathode and a plurality of anodes and control electrodes therefor, and means to stop simultaneously the flow of energy to said discharge device from both of said circuits, said means comprising a source of negative control-electrode potential, stationary contact means connected to said source, and a circuit breaker responsive to reverse current in said device to open said direct current circuit, said breaker including a movable member provided with contact means adapted to coact with said stationary contact means to connect said control electrodes to said source of negative potential when said circuit breaker is opened.

10. The combination of a direct and an alternating current circuit, means for transferring power between said circuits including an arc discharge device having a cathode and a plurality of anodes and control electrodes therefor, a source of positive control-electrode potential, a source of negative control-electrode potential, stationary contact means connected to said sources, and a circuit breaker responsive to reverse current in said device to open said direct current circuit, said breaker including a movable member provided in the closed position of said breaker to coact with certain of said stationary contact means to connect said control electrodes to said source of positive potential and in the open position of said breaker to coact with certain others of said stationary contact means to connect said control electrodes to said sources of negative potential.

DAVID C. PRINCE.